June 13, 1972  A. S. MITCHELL  3,669,557

APPARATUS FOR DETECTING BROKEN TOOLS

Filed May 5, 1970  2 Sheets-Sheet 1

INVENTOR
ARCHIBALD S. MITCHELL

BY *Olsen and Stephenson*
ATTORNEYS

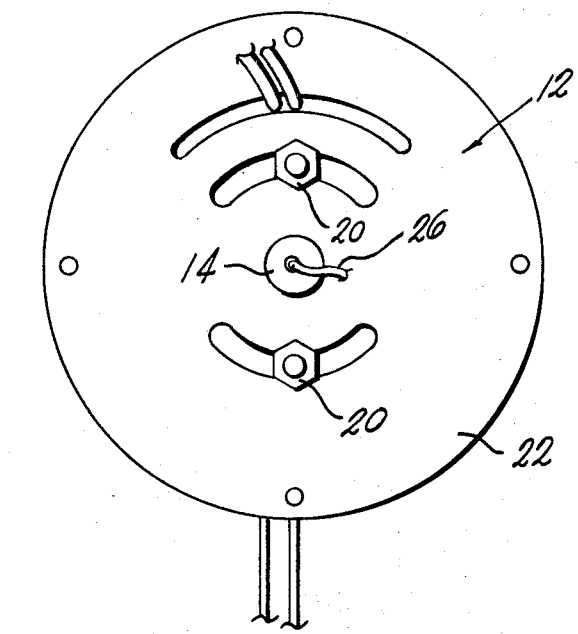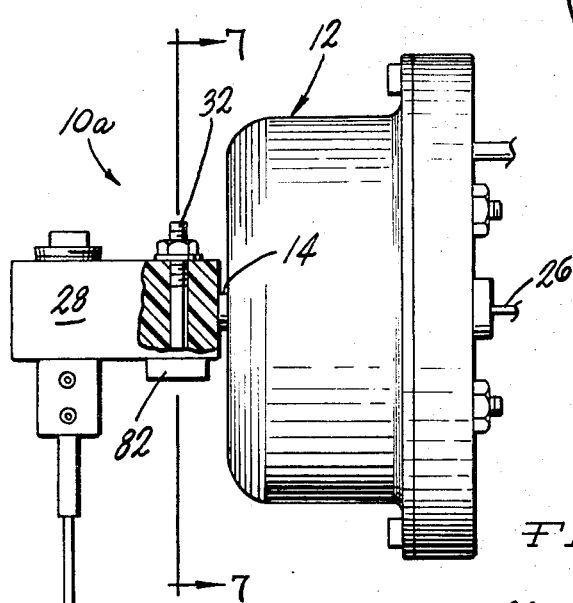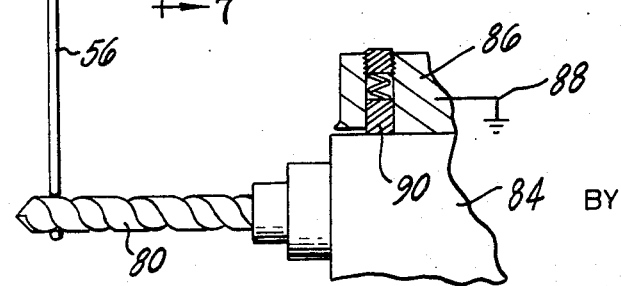

United States Patent Office 3,669,557
Patented June 13, 1972

3,669,557
APPARATUS FOR DETECTING BROKEN TOOLS
Archibald S. Mitchell, East Detroit, Mich., assignor to La Salle Machine Tool, Inc., Warren, Mich.
Filed May 5, 1970, Ser. No. 34,694
Int. Cl. B23b 49/00
U.S. Cl. 408—16
14 Claims

ABSTRACT OF THE DISCLOSURE

Apparatus for monitoring the condition of machine tools for the purpose of detecting a broken or missing tool. The apparatus consists of an electric current carrying tool sensing probe which is rotatably mounted adjacent a tool to be monitored. When the tool is in proper condition, rotation of the probe through a predetermined angle will result in contact of the probe with the tool. In the case of a broken or missing tool condition, such as when the tool has been broken off, no contact between probe and tool will be obtained resulting in an electric signal indicative of this tool condition. A rotary solenoid is employed to rotate the tool sensing probe, and in one form of the invention a second probe, parallel to the first probe, is connected to ground for completing the circuit when the tool to be detected is in proper condition. In another form of the invention, the second probe is omitted and the drive spindle for the tool is connected to ground.

---

In an automated machine tool assembly wherein a workpiece is progressively moved through a series of work stations at which machine tools of various types, such as drills, taps, and the like, perform successive operations on the workpiece, it is desirable to be able to automatically detect a broken tool condition before a large number of workpieces have, as a result of the broken tool, been defectively finished. The same is true in the event a tool is inadvertently removed from its supporting spindle or the like. Accordingly, it is desirable, in machine tool apparatus of this type, to provide structure for automatically detecting a broken or missing tool condition so that appropriate corrective steps can be taken as soon as possible. It is an object of the present invention, therefore, to provide improved apparatus for detecting broken or missing tools.

The broken tool detector apparatus of this invention consists of a rotary solenoid which is preset to rotate a shaft therein through a predetermined angled. The shaft is positioned in the vicinity of and substantially parallel to the tool to be monitored, and a current carrying conductor is extended through an axial opening in the shaft. A plastic block, of electrically non-conducting material, is mounted on the shaft in a supporting relation with a tool sensing probe which is connected to the conductor so that it can carry current to the tool. The predetermined angle of rotation of the shaft is such that in response to such rotation, the probe will be rotated slightly past the tool to be monitored. This insures contact of the probe with the tool in the event the tool is unbroken and in operating condition. In one form of the invention, a second probe is mounted on the block so that it is parallel to the first probe and is connected to the solenoid shaft which is in turn grounded. As a result, when the tool is in proper condition, a circuit will be completed through the probe, and when the tool is broken or missing, no such circuit will be completed. In another form of the invention, the second probe is omitted and the drive spindle for the tool is connected to ground to similarly complete the desired circuit only when the tool is in proper condition. The present invention thus provides, in both forms, for a detecting circuit which is completed only when the tool is in proper condition. The absence of the completed circuit indicates a broken or missing tool condition which can then be corrected.

Further objects, features and advantages of this invention will become apparent from a consideration of the following description, the appended claims, and the accompanying drawing in which:

Figure 4:
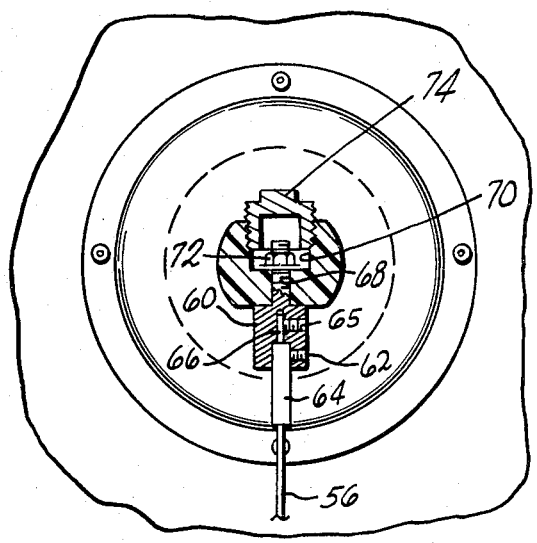
Figure 3:
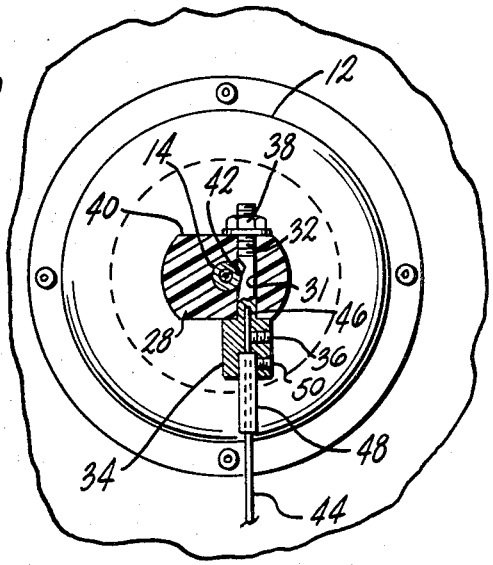
Figure 2:
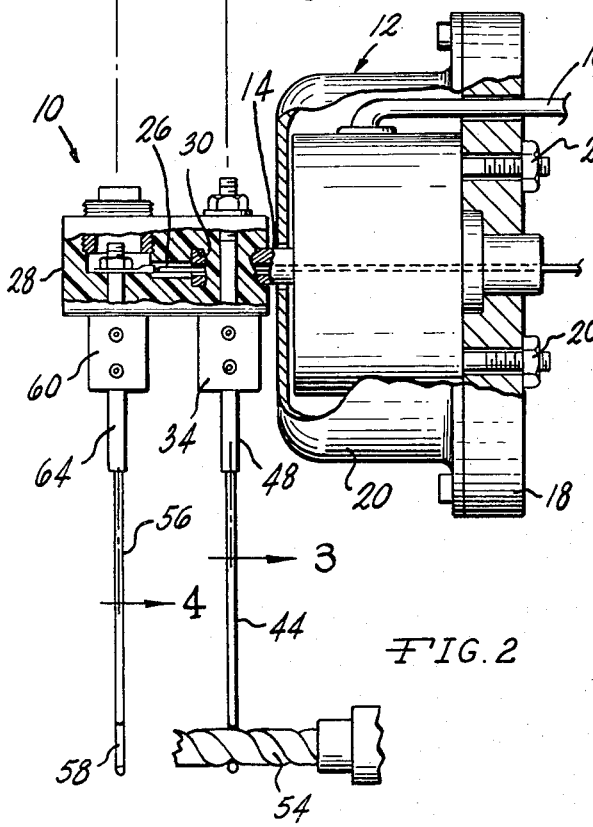
FIG. 2 is a side view of the structure illustrated in FIG. 1, with some parts broken away and other parts shown in section for the purpose of clarity.

FIGS. 3 and 4 are transverse sectional views of the apparatus of this invention as seen from substantially the lines 3—3 and 4—4 in FIG. 2 and showing the apparatus in its retracted position;

FIG. 5 is a rear view of the apparatus of this invention;

FIG. 6 is a side view like FIG. 2 of a modified form of the apparatus of this invention; and FIG. 7 is a sectional view of the structure shown in FIG. 6 as seen from substantially the line 7—7 in FIG. 6.

Figure 1:
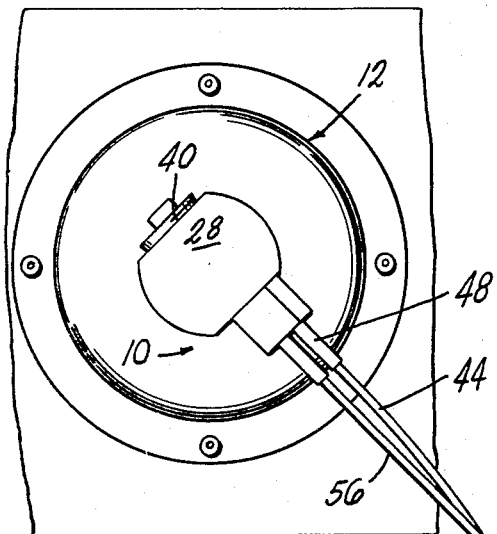
FIG. 1 is a front view of the apparatus of this invention shown in a rotated position for detecting a broken tool.

With reference to the drawing, the tool detector apparatus of this invention, indicated generally at 10, is illustrated in FIG. 1 as including a rotary solenoid assembly 12, of conventional construction, having a shaft 14 (FIG. 2) which is connected to a supply of current through a lead 16. The solenoid assembly 12 is mounted on a suitable support 18, which is also electrically grounded, and is conventionally adjustable, by manipulation of control nut and bolt assemblies 20 (FIGS. 2 and 5) which extend through the rear side of the solenoid housing 22, to preset the angle and direction of rotation of the shaft 14 which is obtained in response to an energizing electrical signal applied to the solenoid assembly 12 through the lead 16.

In adapting the rotary solenoid 12 to the apparatus of this invention, the shaft 14 is provided with an axial opening 24 through which an insulated conductor 26, connected to a source of current, is extended for a purpose to appear presently. A mounting block 28, formed of an electrically insulating material such as plastic, is formed in one end with an opening 30 that is telescoped over the shaft 14. As shown in FIG. 3, the block 28 also has a transversely extended opening 31 formed therein. A body 34, which has an integral bolt extension 32 extended through the opening 31, is engaged with the bottom side of block 28. A nut 38, threaded onto the opposite end of the bolt 32, can be tightened against one side 40 of the block 28 so as to pull the body 34 tightly against the opposite side of the block 28. As shown in FIG. 3, the opening 31 intersects one side of the shaft 14. The bolt 32 has an inclined surface 42 which is pulled firmly against this side of the shaft 14 in response to tightening of the nut 38. Firm engagement of the inclined surface 42 with the shaft 14 serves two purposes. First, it mounts the block 28 securely on the shaft 14 and, second, it provides for a current carrying contact between the bolt 32 and the shaft 14 for a purpose to appear presently.

The body 34 also supports a tool sensing probe 44 of elongated flexible construction formed of a current carrying material such as metal. The probe 44 has an upper end portion 46 which is attached to the body 34 by a set screw 36 and which also extends through a plastic tubular member 48 that is projected into and secured to the body 34 by a set screw 50. As shown in FIG. 1, the probe 44 has an arcuate terminal end portion 52 engageable with a tool 54 to be monitored. When the probe 44 is moved to a position in which its end portion 52 engages the tool 54, by supply of current through the lead 16, the probe 44 is bent or deflected to insure firm engagement between the tool end portion 52 and the tool 54. The tubular member 48 functions to preclude a sharp bending of the probe 44 at a position adjacent the block 28 to thus prevent fatigue failure of the probe 44 at a point of continual bending. In other words, the tubular member 48 is sufficiently flexible to spread the bending of the probe 44 over a portion of its length to thus prevent any sharp bends.

A second probe 56, having a curved terminal end portion 58, identical to the probe 44, is mounted on the block 28 at a position spaced axially of the shaft 14 from the probe 44. The block 60 (FIG. 4), which also has an integral bolt extension 68, is secured by a nut 72 to the block 28. A plastic tubular member 64, which functions like the tubular member 48 previously described, is telescoped over the upper end portion 66 of the probe 56 and is secured to block 60 by a set screw 62. A set screw 65 secured the probe portion 66 to the block 28. The nut 72 is located in a cavity 70 formed in the top side 40 of the block and is threaded onto the upper end of the bolt extension 68 so as to pull the body 60 firmly against the lower side of the block 28. A plug 74 is threaded into the top side of the block 28 so as to close the cavity.

The nut 72 also functions to electrically connect the conductor 26 to the upper end of the bolt 68. As a result, current can flow through the conductor 26 and the bolt 68 to the probe 56. In the event the probe 56 makes electrical contact with a tool, at the same time that the tool is contacted by the probe 44, current from the probe 56 can flow through the tool and the probe 44 to the shaft 14 and to ground to complete a circuit indicating proper tool condition. When the end of the tool is broken off, as illustrated for the tool 54 in FIGS. 1 and 2, rotation of the shaft 14 to the position shown in FIG. 1 in which the probe 44 contacts tool 54 will not provide for contact of the probe 56 with the tool 54 and, as a result, the circuit will not be completed thus indicating a broken or missing tool.

A modified form of the apparatus of this invention, indicated generally at 10a, is illustrated in FIGS. 6 and 7 for monitoring a tool 80. The apparatus 10a is in many respects identical to the apparatus 10 and for that reason numerals are used in the apparatus 10a to indicate components corresponding to the similarly numbered components in the apparatus 10. The apparatus 10a includes the rotary solenoid 12 having the shaft 14 and the block 28 mounted on the shaft 14 so as to support the probe 56 in a position for receiving current from the conductor 26. In the apparatus 10a, however, the probe 44 is eliminated and a simple head 82 is mounted on the lower end of the bolt 32 so that the bolt 32 can function, as in the apparatus 10, to secure the block 28 to the shaft 14.

In the apparatus 10a, the tool 80 is driven by a spindle 84 mounted in a housing 86 which is connected to ground, as shown at 88. A spring pressed carbon brush 90 provides for an electrical contact between the housing 86 and the spindle 84. As a result, when the probe 56 contacts the tool 80, a circuit will be completed to ground 88 through the tool 80, the spindle 84 and the housing 86. Thus, the apparatus 10a functions like the apparatus 10 to indicate a broken or missing tool condition when no monitoring circuit is completed in response to rotation of the probe 56.

In the operation of the apparatus 10 and the apparatus 10a, the rotary solenoid assembly 12 is operated, following each operation of the tool 54 and 80, respectively, to rotate the shaft 14 through a predetermined angle. As shown in FIG. 1, this angle of rotation exceeds the angle necessary to contact the probe 56 with the tool to be monitored. As a consequence, when the tool is in proper condition, a firm contact of the arcuate probe end portion 58 with the tool is insured to provide for the desired flow of current to the tool to indicate proper tool condition. In the event the circuit is not completed, because the probe 56 does not contact the tool to be monitored, the absence of the electrical signal indicates the necessity to replace the tool. The rotary solenoid is then de-energized to rotate the probe or probes to an out-of-the-way position relative to the tool to be monitored. It can thus be seen that this invention provides apparatus 10 and 10a which is continuously effective to provide the desired tool monitoring function.

What is claimed is:

1. Apparatus comprising, a machine tool capable of being broken off during use, shaft means disposed adjacent said tool, motor means drivingly connected to said shaft means so that said motor means is capable of rotating said shaft means through a predetermined angle, a conductor for electric current, and tool condition sensing means mounted on said shaft and connected to said conductor, said sensing means being operable in response to rotation of said shaft through said predetermined angle to provide for a predetermined electrical indication utilizing said current only when said tool is not broken off.

2. Apparatus according to claim 1 wherein said sensing means consists of an elongated electric current carrying probe.

3. Apparatus according to claim 2 wherein said probe has a curved end engageable with said tool and wherein said probe is of a bendable construction intermediate said shaft and said end.

4. Apparatus according to claim 3 further including a probe supporting block secured to said shaft means, said block being formed of an electrically non-conducting material, current conductor means extending axially through said shaft, and means mounting said probe on said block and connecting said probe to said conductor for receiving current therefrom.

5. Apparatus according to claim 4 further including a second probe mounted on said shaft in an axially spaced relation with said first probe, said second probe being electrically connected to said shaft which is in turn connected to ground.

6. Apparatus according to claim 4 further including spindle means supporting said tool to be monitored, and means engaged with said spindle means and electrically connected to ground.

7. Apparatus according to claim 1 wherein said means for rotating said shaft means is a rotary solenoid disposed in a supporting relation with said shaft means.

8. Apparatus comprising a machine tool, shaft means disposed adjacent said tool, motor means drivingly connected to said shaft means so that said motor means is capable of rotating said shaft means through a predetermined angle, current carrying conductor means extending longitudinally through said shaft, a tool sensing probe of thin elongated bendable construction attached to said shaft for rotation therewith through said predetermined angle, said probe being formed of an electrically conductive material and being movable in response to rotation of said shaft through said predetermined angle between a position angularly spaced from said tool and a bent position engaged with said tool, and means electrically conductively connecting said probe to said conductor means so that current can flow from said conductor means through said probe to said tool when said probe is engaged with said tool.

9. Apparatus according to claim 8 further including a probe supporting block formed of an electrically non-conductive material and mounted on said shaft in a supporting relation with said sensing probe.

10. Apparatus according to claim 9 further including a second sensing probe mounted on said shaft in an axially spaced relation with said first sensing probe, and means providing for an electrically conductive contact between said second probe and said shaft.

11. Apparatus according to claim 10 further including means attaching said second probe to said shaft comprising a probe extension member extended through said block and having an inclined surface engaged with one side of said shaft, and means on said extension engaged with said block and operable to force said inclined surface into firm engagement with said one side of said shaft.

12. Apparatus according to claim 9 wherein said shaft projects into said block, means securing said block to said shaft comprising a member extending through said block so as to intersect said shaft, inclined surface means on said member engaged with one side of said shaft, means on one end of said member limiting movement thereof through said block, and means on the opposite end of said member engaged with said block and operable to pull said inclined surface into engagement with said one side of said shaft.

13. Apparatus according to claim 12 further including a second sensing probe mounted on said shaft in an axially spaced relation with said first sensing probe, and means electrically connecting said second sensing probe to said member extending through said block, whereby a circuit can be completed through said probes and a tool to be monitored and engaged with said probes so as to extend therebetween.

14. Apparatus according to claim 12 further including spindle means supporting said tool to be monitored, and means engaged with said spindle means and electrically connected to ground.

References Cited
UNITED STATES PATENTS

| | | | |
|---|---|---|---|
| 2,920,508 | 1/1960 | Wennerberg | 408—6 |
| 3,301,100 | 1/1967 | Hubeny | 408—6 |
| 1,935,979 | 11/1933 | Hubbard | 408—16 X |

FRANCIS S. HUSAR, Primary Examiner

U.S. Cl. X.R.

340—267 R